(12) United States Patent
Tuttle

(10) Patent No.: US 7,265,674 B2
(45) Date of Patent: Sep. 4, 2007

(54) THIN FLEXIBLE, RFID LABELS, AND METHOD AND APPARATUS FOR USE

(75) Inventor: John R. Tuttle, Corrales, NM (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/206,350

(22) Filed: Aug. 18, 2005

(65) Prior Publication Data

US 2005/0285744 A1    Dec. 29, 2005

Related U.S. Application Data

(60) Continuation of application No. 10/705,685, filed on Nov. 10, 2003, now Pat. No. 7,158,031, which is a continuation of application No. 09/481,807, filed on Jan. 11, 2000, now Pat. No. 6,741,178, which is a division of application No. 08/934,701, filed on Sep. 22, 1997, now Pat. No. 6,013,949, which is a continuation of application No. 08/610,236, filed on Mar. 4, 1996, now abandoned, which is a continuation of application No. 08/168,909, filed on Dec. 17, 1993, now Pat. No. 5,497,140, which is a continuation of application No. 07/928,899, filed on Aug. 12, 1992, now abandoned.

(51) Int. Cl.
*G08B 13/14* (2006.01)

(52) U.S. Cl. .............................. 340/572.1; 340/572.7; 340/572.8; 340/10.1; 340/825.27; 340/825.29; 235/380; 235/492

(58) Field of Classification Search ............ 340/572.1, 340/572.7, 572.8, 10.1, 25.27, 825.29; 235/380, 235/492
See application file for complete search history.

(56) References Cited

U.S. PATENT DOCUMENTS

| | | | |
|---|---|---|---|
| 3,701,317 A | 10/1972 | Miyamoto et al. | 101/107 |
| 3,706,094 A | 12/1972 | Cole et al. | 342/44 |
| 3,750,167 A | 7/1973 | Gehman et al. | 342/44 |
| 3,780,368 A | 12/1973 | Northeved et al. | 342/44 |
| 3,832,530 A | 8/1974 | Reitbock et al. | 342/44 |
| 3,849,633 A | 11/1974 | Reitbock et al. | 235/487 |

(Continued)

FOREIGN PATENT DOCUMENTS

DE    38 24 870 A1    4/1989

(Continued)

OTHER PUBLICATIONS

Casson, K., et al., "High Temperature Packaging: Flip Chip on Flexible Laminate", *Surface Mount Technology*, pp. 19-20 (Jan. 1992).

(Continued)

*Primary Examiner*—Tai Nguyen
(74) *Attorney, Agent, or Firm*—Wells St. John, P.S.

(57) ABSTRACT

A radio frequency identification (REID) device may include a first, thin, flexible sheet, an antenna, and an integrated circuit. A surface portion of the first sheet may be affixed to a second, thin, flexible sheet to form a thin, flexible label. Such a label may be affixed to an article for tracking by an interrogation system.

98 Claims, 6 Drawing Sheets

U.S. PATENT DOCUMENTS

| | | | |
|---|---|---|---|
| 3,981,761 A | 9/1976 | Kojima et al. | 156/235 |
| 4,049,969 A | 9/1977 | Salonimer et al. | 356/5 |
| 4,075,632 A | 2/1978 | Baldwin et al. | 343/68 R |
| 4,135,184 A | 1/1979 | Pruzick | 340/572 |
| 4,232,512 A | 11/1980 | Yoshikawa et al. | 368/82 |
| 4,331,957 A | 5/1982 | Enander et al. | 342/22 |
| 4,399,441 A | 8/1983 | Vaughan et al. | 342/50 |
| 4,412,356 A | 10/1983 | Klaus et al. | 455/603 |
| 4,413,254 A | 11/1983 | Pinneo et al. | 340/572 |
| 4,418,411 A | 11/1983 | Strietzel | 340/870.16 |
| 4,484,355 A | 11/1984 | Henke et al. | 455/76 |
| 4,506,148 A | 3/1985 | Berthold et al. | 235/380 |
| 4,539,472 A | 9/1985 | Poetker et al. | 235/488 |
| 4,724,340 A | 2/1988 | Sood | 340/572 |
| 4,724,427 A | 2/1988 | Carroll | 340/572 |
| 4,727,560 A | 2/1988 | Van Zanten et al. | 377/60 |
| 4,746,618 A | 5/1988 | Nath et al. | 437/2 |
| 4,746,830 A | 5/1988 | Holland | 310/313 |
| 4,756,717 A | 7/1988 | Sturgis et al. | 427/290 |
| 4,777,563 A * | 10/1988 | Teraoka et al. | 361/739 |
| 4,783,646 A | 11/1988 | Matsuzaki | 340/572 |
| 4,827,110 A | 5/1989 | Rossi et al. | 235/376 |
| 4,827,395 A | 5/1989 | Anders et al. | 364/138 |
| 4,854,328 A | 8/1989 | Pollack | 128/736 |
| 4,857,893 A | 8/1989 | Carroll | 340/572 |
| 4,911,217 A | 3/1990 | Dunn et al. | 152/152.1 |
| 4,918,631 A | 4/1990 | Hara et al. | 364/708 |
| 4,926,182 A | 5/1990 | Ohta et al. | 342/44 |
| 4,942,327 A | 7/1990 | Watanabe et al. | 310/313 R |
| 4,960,983 A | 10/1990 | Inoue | 235/449 |
| 4,962,415 A | 10/1990 | Yamamoto et al. | 357/74 |
| 5,008,776 A | 4/1991 | Queyssac | 361/392 |
| 5,023,573 A | 6/1991 | Adam | 333/17.2 |
| 5,055,968 A | 10/1991 | Nishi et al. | 361/395 |
| 5,095,240 A | 3/1992 | Nysen et al. | 310/313 |
| 5,124,782 A | 6/1992 | Hundt et al. | 257/724 |
| 5,134,277 A | 7/1992 | Yerbury et al. | 250/214 |
| 5,144,314 A | 9/1992 | Malmberg et al. | 342/44 |
| 5,148,355 A | 9/1992 | Lowe et al. | 361/410 |
| 5,148,504 A | 9/1992 | Levi et al. | 385/14 |
| 5,153,710 A | 10/1992 | McCain | 357/14 |
| 5,164,732 A | 11/1992 | Brockelsby et al. | 342/44 |
| 5,166,502 A | 11/1992 | Rendleman et al. | 235/492 |
| 5,175,418 A * | 12/1992 | Tanaka | 235/439 |
| 5,206,495 A | 4/1993 | Kreft | 235/492 |
| 5,214,410 A | 5/1993 | Verster | 340/572 |
| 5,266,925 A | 11/1993 | Vercellotti et al. | 340/572 |
| 5,274,221 A * | 12/1993 | Matsubara | 235/492 |
| 5,302,954 A | 4/1994 | Brooks et al. | 342/44 |
| 5,313,211 A | 5/1994 | Tokuda et al. | 340/50 |
| 5,317,309 A | 5/1994 | Vercellotti et al. | 340/825 |
| 5,337,063 A | 8/1994 | Takahira | 343/741 |
| 5,340,968 A * | 8/1994 | Watanabe et al. | 235/380 |
| 5,347,263 A | 9/1994 | Carroll et al. | 340/825 |
| 5,402,095 A | 3/1995 | Janniere | 235/441 |
| 5,412,192 A | 5/1995 | Hoss | 235/380 |
| 5,414,427 A | 5/1995 | Gunnarson | 342/825 |
| 5,428,214 A | 6/1995 | Hakkers et al. | 235/492 |
| 5,448,110 A | 9/1995 | Tuttle et al. | 257/723 |
| 5,483,827 A | 1/1996 | Kulka et al. | 73/146.5 |
| 5,497,140 A | 3/1996 | Tuttle | 342/51 |
| 5,528,222 A | 6/1996 | Moskowitz et al. | 340/472 |
| 5,541,399 A | 7/1996 | de Vall | 235/491 |
| 5,566,441 A | 10/1996 | Marsh et al. | 29/600 |
| 5,572,226 A | 11/1996 | Tuttle | 343/726 |
| 5,574,470 A | 11/1996 | de Valle | 343/895 |
| 5,598,032 A | 1/1997 | Fidalgo | 257/679 |
| 5,600,175 A | 2/1997 | Orthmann | 257/532 |
| 5,621,412 A | 4/1997 | Sharpe et al. | 342/51 |
| 5,647,122 A | 7/1997 | Launay et al. | 29/840 |
| 5,649,296 A | 7/1997 | MacLellan et al. | 455/38.2 |
| 5,719,586 A | 2/1998 | Tuttle | 343/726 |
| 5,729,053 A | 3/1998 | Orthmann | 257/724 |
| 5,735,040 A | 4/1998 | Ochi et al. | 29/841 |
| 5,776,278 A | 7/1998 | Tuttle et al. | 156/213 |
| 5,779,839 A | 7/1998 | Tuttle et al. | 156/213 |
| 5,809,633 A | 9/1998 | Mundigl et al. | 29/600 |
| 5,850,690 A | 12/1998 | Launay et al. | 29/841 |
| 5,880,934 A | 3/1999 | Haghiri-Tehrani | 361/737 |
| 5,880,937 A | 3/1999 | Schadhauser et al. | 361/794 |
| 5,955,949 A | 9/1999 | Cocita | 340/572 |
| 5,982,284 A | 11/1999 | Baldwin et al. | 340/572 |
| 6,036,099 A | 3/2000 | Leighton | 235/488 |
| 6,130,602 A | 10/2000 | O'Toole et al. | 340/10.33 |
| 6,265,977 B1 | 7/2001 | Vega et al. | 340/572 |
| 6,294,998 B1 | 9/2001 | Adams et al. | 340/572 |
| 6,514,367 B1 | 2/2003 | Leighton | 156/153 |

FOREIGN PATENT DOCUMENTS

| | | |
|---|---|---|
| DE | 41 20 265 A1 | 6/1991 |
| DE | 3201065 | 7/1993 |
| DE | 4431605 | 3/1996 |
| EP | 0 595 549 A2 | 10/1993 |
| EP | 0 682 321 | 5/1995 |
| GB | 1 567 784 | 5/1980 |
| JP | 1-191082 | 8/1989 |
| JP | 2-36476 | 3/1990 |
| JP | 2-179794 | 7/1990 |
| JP | 3-224799 | 10/1991 |
| JP | 4-359183 | 11/1992 |
| JP | 7-200766 A | 8/1995 |
| JP | 8-7066 | 1/1996 |
| JP | 8-96090 A | 4/1996 |
| JP | 8-111573 | 4/1996 |
| JP | 8-138022 | 5/1996 |
| WO | WO90/07858 | 7/1990 |
| WO | WO96/07985 | 3/1996 |

OTHER PUBLICATIONS

Johnson, R.W., "Polymer Thick Films: Technology and Materials", *Circuits Manufacturing* (reprint), 4 pages (Jul. 1982).

Gilleo, K., "Using SM Devices on Flexible Circuitry", *Electri-Onics*, pp. 20-23 (Mar. 1986).

Kanatzibis, Mercouri G., "Conductive Polymers", *Chemical and Engineering News—American Chemical Society*, pp. 36-54 (Dec. 1990).

* cited by examiner

THIN FLEXIBLE, RFID LABELS, AND METHOD AND APPARATUS FOR USE

CROSS REFERENCE TO RELATED APPLICATION

This is a continuation of U.S. patent application Ser. No. 10/705,685, filed Nov. 10, 2003 now U.S. Pat. No. 7,158,031, entitled "Miniature Radio Frequency Transceiver", naming John R. Tuttle as inventor; which in turn is a continuation of U.S. patent application Ser. No. 09/481,807 filed Jan. 11, 2000, now U.S. Pat. No. 6,741,178; which in turn is a divisional of U.S. patent application Ser. No. 08/934,701 filed Sep. 22, 1997, now U.S. Pat. No. 6,013,949; which in turn is a continuation of U.S. patent application Ser. No. 08/610,236, filed Mar. 4, 1996, now abandoned; which in turn is a continuation of U.S. patent application Ser. No. 08/168,909 filed Dec. 17, 1993, now U.S. Pat. No. 5,497,140; which in turn is a continuation of U.S. patent application Ser. No. 07/928,899 filed Aug. 12, 1992 now abandoned, all of which are incorporated herein by reference.

TECHNICAL FIELD

This invention relates generally to radio frequency identification devices.

BACKGROUND OF THE INVENTION

In my application Ser. No. 07/899,777 entitled "Radio Frequency Identification Device (RFID) and Method of Manufacture, Including an Electrical Operating System and Method", filed Jun. 17, 1992, there are disclosed and claimed new and improved radio frequency identification (RFID) tags which may be affixed to various articles (or persons) so that these articles, when shipped, may be easily tracked from the point of shipment origin, then along a given route, and then readily located upon reaching a point of destination. These RFID tags are constructed within a small area on the order of one inch (1") square or less and of a thickness on the order of 30 mils. These tags include, among other things, an integrated circuit (IC) chip having transmitter, receiver, memory and control logic sections therein which together form an IC transceiver capable of being powered by either a small battery or by a capacitor charged from a remote RF source. The IC chip including the RF transmitter and receiver sections operates to provide for the RF signal transmission and reception to and from remote sources, and a thin film antenna is also constructed within the above small area. The above novel RFID system operates to receive, store, and transmit article-identifying data to and from the memory within the IC chip. This data is stored within the IC chip memory stage and may be subsequently called up and transmitted to an interrogating party at the above point of origin, points along a given shipment route, and then upon reaching a point of destination. This application is assigned to the present assignee and is incorporated herein by reference.

The RFID device disclosed and claimed in my above identified application represents not only a fundamental breakthrough in the field of RF identification generally, but also represents significant specific advances over the prior art described in some detail in this application. This prior art includes relatively large hybrid electronic packages which have been affixed to railroad cars to reflect RF signals in order to monitor the location and movement of such cars. This prior art also includes smaller passive RFID packages which have been developed in the field of transportation and are operative for tracking automobiles. These reflective passive RFID packages operate by modulating the impedance of an antenna, but are generally inefficient in operation, require large amounts of power to operate, and have a limited data handling capability.

The above mentioned prior art still further includes bar code identification devices and optical character recognition (OCR) devices which are well known in the art. However, these bar code identification and OCR devices require labor intensive operation and tend to be not only very expensive, but highly unreliable. However, all of the above mentioned prior art devices described in my above application are only remotely related to the present invention as will become more readily apparent in the following description thereof.

SUMMARY

The general purpose and principal object of the present invention is to provide still further new and useful improvements in the field of radio frequency identification (RFID) generally and improvements which are particularly adapted and well-suited for operation with electrically powered postage stamps and mailing labels. These new and useful improvements are made both with respect to the novel devices and processes described and claimed in my above identified application, and also with respect to all of the prior art described therein.

To accomplish the above purpose and object, there have been developed both an electrically powered postage stamp and an electrically powered mailing label, each of which include, in combination, an integrated circuit chip having an RF transceiver constructed therein; a thin flat battery cell connected to the IC chip for providing power thereto; and a thin film RF antenna connected to the IC chip for transmitting data to and from the IC chip. All of the above components are connected in a very thin array and mounted between opposing major facing surfaces of either a postage stamp or a larger mailing or shipping label in a substantially two dimensional planar configuration. These components are operative to store data in the IC chip memory, which data includes such things as the destination address, return address, and descriptions of the contents of the article being mailed or shipped. These components are further operative in a novel system combination to transmit the stored data to an interrogating party upon receipt of RF interrogation signals transmitted to the stamp or label, or to receive data from same.

Accordingly, it is another object of this invention to provide a new and improved RFID stamp or label of the type described which is uniquely constructed in an essentially two dimensional configuration which is easily scalable to the two dimensional major surface area of either a postage stamp or a mailing label.

Another object of this invention is to provide a new and improved electronically powered stamp or label of the type described and process for making the stamp or label which employs certain novel, thin film fabrication techniques capable of producing device thicknesses on the order of a fraction of a millimeter. These thicknesses are typically within the range of one to five mils, thereby being extremely well suited and adapted for use with corresponding postage stamp or mailing label thickness dimensions.

A further object of this invention is to provide a new and improved electronically powered postage stamp or mailing label of the type described including RFID integrated circuitry which is operatively powered by a flat and very thin battery and imparts a high and sophisticated degree of RF communication capability to these stamps or labels without significantly increasing the overall size and volume of the stamps or labels.

In one aspect, an RFID device may include a first, thin, flexible sheet, an antenna, and an integrated circuit. A surface portion of the first sheet may be affixed to a second, thin, flexible sheet to form a thin, flexible label. Such a label may be affixed to an article for tracking by an interrogation system.

The above brief summary of the invention, together with its various objects, novel features and attendant advantages, will become more readily apparent in the following description of the accompanying drawings.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
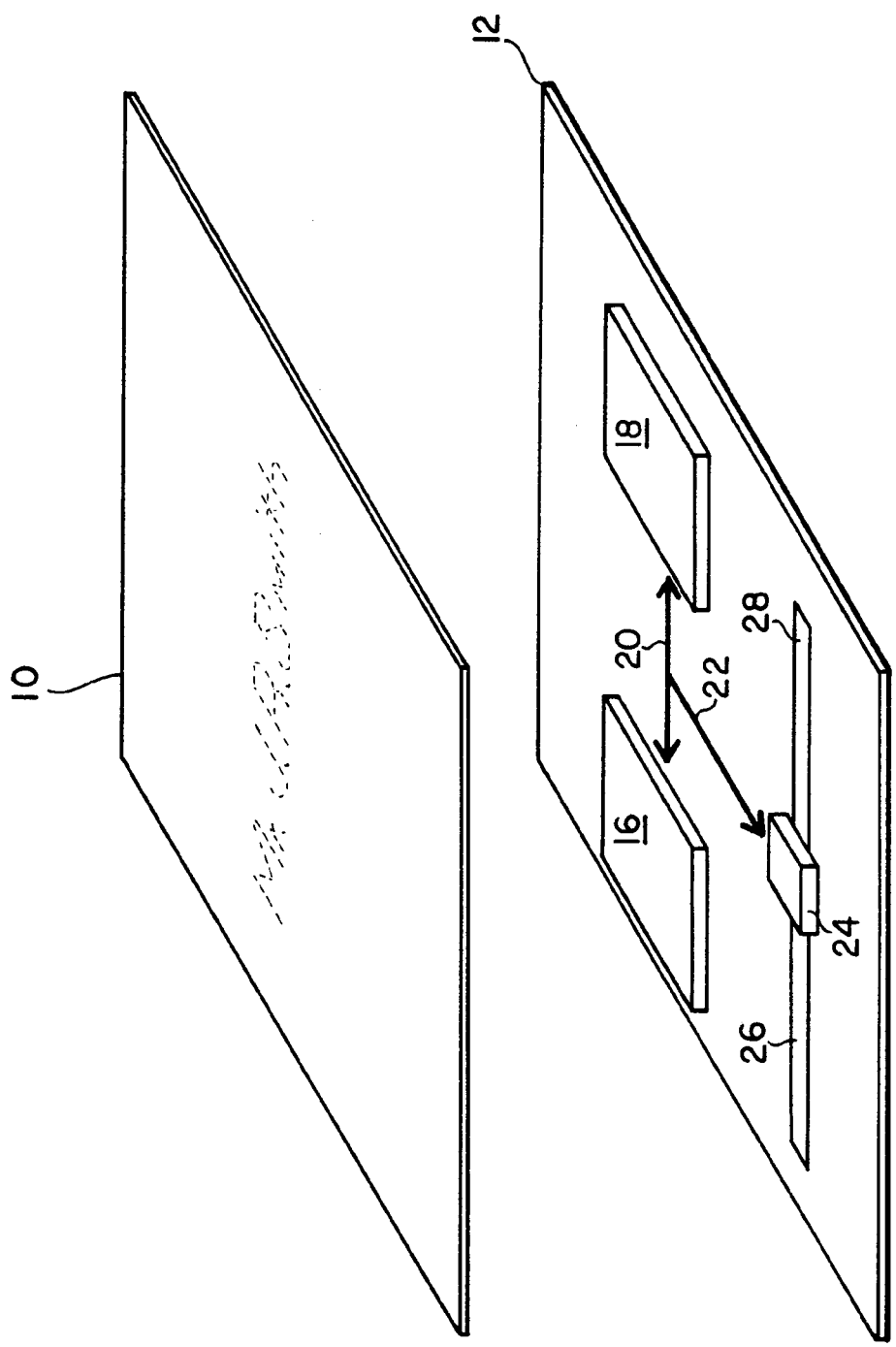
FIG. 1 is an exploded perspective view of the electrically powered mailing or shipping label embodiment of the invention, including the novel radio frequency identification system mounted on the label base member. However, it should be understood that there is no basic functional difference in the label and stamp embodiments of the invention, and that the label cover and label base members shown in FIG. 1 apply equally as well to the smaller stamp cover or stamp base members which, for sake of brevity, have not been shown in the drawings.

Referring now to FIG. 1, the electrically powered, RF operative label or stamp includes a cover member 10 and a base member 12 upon which a radio frequency identification system has been constructed using thin film deposition techniques of the type described in my above identified application Ser. No. 07/899,777, filed Jun. 17, 1992. Functionally speaking, the RFID system 14 will include one or more thin flat battery cells 16 and 18 which are connected in series as indicated by line 20 and are both connected via line 22 to drive an integrated circuit transceiver chip 24. The IC transceiver chip 24 will preferably be connected to a dipole antenna consisting of thin film antenna strips 26 and 28, and the dipole antenna 26 and 28 is operative to both transmit RF signals from the IC chip 24 to a controller and to receive incoming RF signals from an external RF source controller and operative to encode this data in IC chip memory in a manner more particularly described below with reference to FIG. 6. This data will typically include information on the article to which the label or stamp are affixed, such as an identification number, the sender's name, point of origin, weight, size, route, destination, and the like. In addition, the RFID system 14 may be used to automatically RF communicate with postage meters and with automatic sorting machines to thereby completely eliminate the need for human intervention for such automatic sorting, thereby greatly reducing automatic mail sorting costs while simultaneously greatly increasing the speed and accuracy of the mail sorting process.

The thin flat battery cells 16 and 18 can be made of various materials and typically include an anode, a collector, a cathode material, and a battery separator including a polymer and electrolytes of the type described below so as to not exceed a total battery thickness of 1 to 10 mils, while simultaneously being flexible and in some cases rechargeable. Furthermore, imminent commercialization of solid thin flat batteries having useful current levels at low temperatures makes the present invention commercially viable. Thus, since the IC chip 24 can also be made of thicknesses of no greater than 8 mils and since the thin film metal dipole antenna strips 26 and 28 may be held to thicknesses less than 1 to 2 mils, it is seen that the total added thickness between the label cover and base layers 10 and 12 will be negligible and not significantly affecting the bulk or the volume of the stamp or label into which the RFID system 14 is incorporated.

Figure 2:
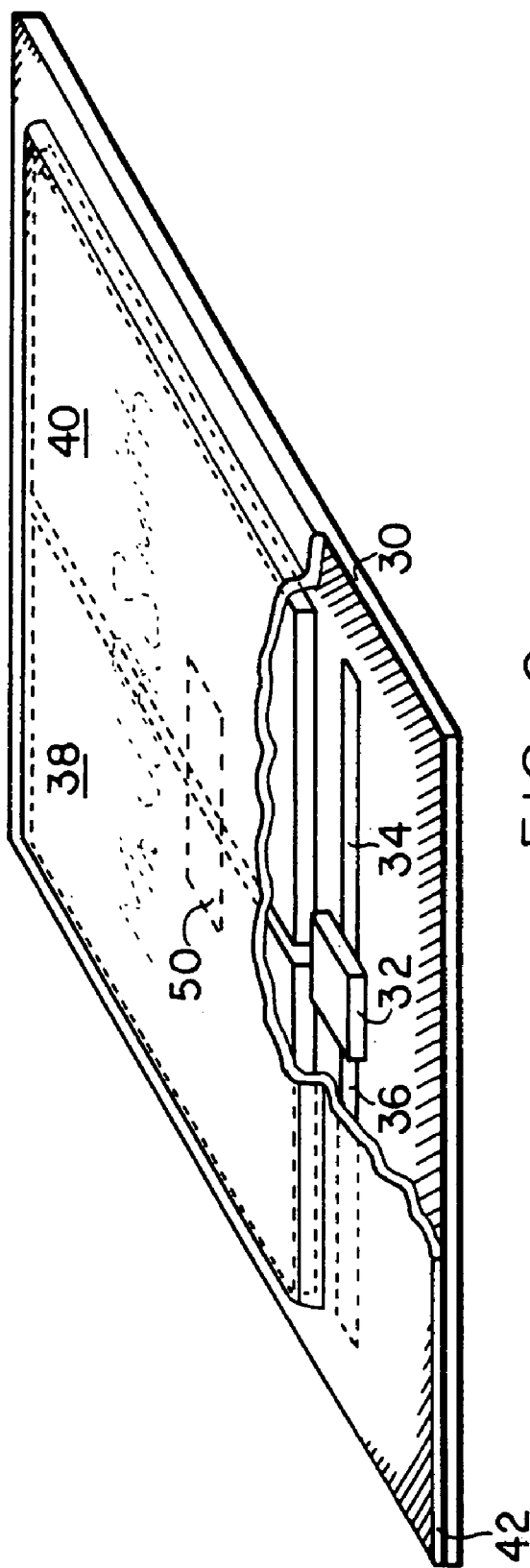
FIG. 2 is an enlarged perspective view of an RFID device and label or stamp package constructed in accordance with a preferred embodiment of the present invention.

Referring now to FIG. 2, there is shown in a perspective view a preferred device embodiment of the present invention wherein the RFID tag includes a base support layer 30 upon which an integrated circuit chip 32 is disposed on the near end of the layer 30 and connected to a dipole antenna consisting of a pair of conductive strips 34 and 36 extending laterally from the chip 32. These conductive strips 34 and 36 will typically be screen printed on the upper surface of the base support layer 30.

A pair of rectangularly shaped batteries 38 and 40 are positioned as shown adjacent to the IC chip 32 and are also disposed on the upper surface of the base support member 30. The two rectangular batteries 38 and 40 are electrically connected in series to power the IC chip 32 in a manner more particularly described below. The device or package shown in FIG. 2 is then completed by the folding over of an outer or upper cover member 42 which is sealed to the exposed edge surface portions of the base member 30 to thereby provide a hermetically sealed and completed package. When the cover member 42 is folded over on the base member, the contact 50 which is attached to batteries 38 and 40 using conductive epoxy, provides the back side series electrical connection for the two batteries 38 and 40. The integrated circuit chip 32 has transmitter, memory, control, logic, and receiver stages therein and is powered by the two batteries 38 and 40 during the transmission and reception of data to and from an interrogator to provide the interrogator with the various above information and identification parameters concerning the article, animal or person to which the RFID tag is attached.

Figure 3:
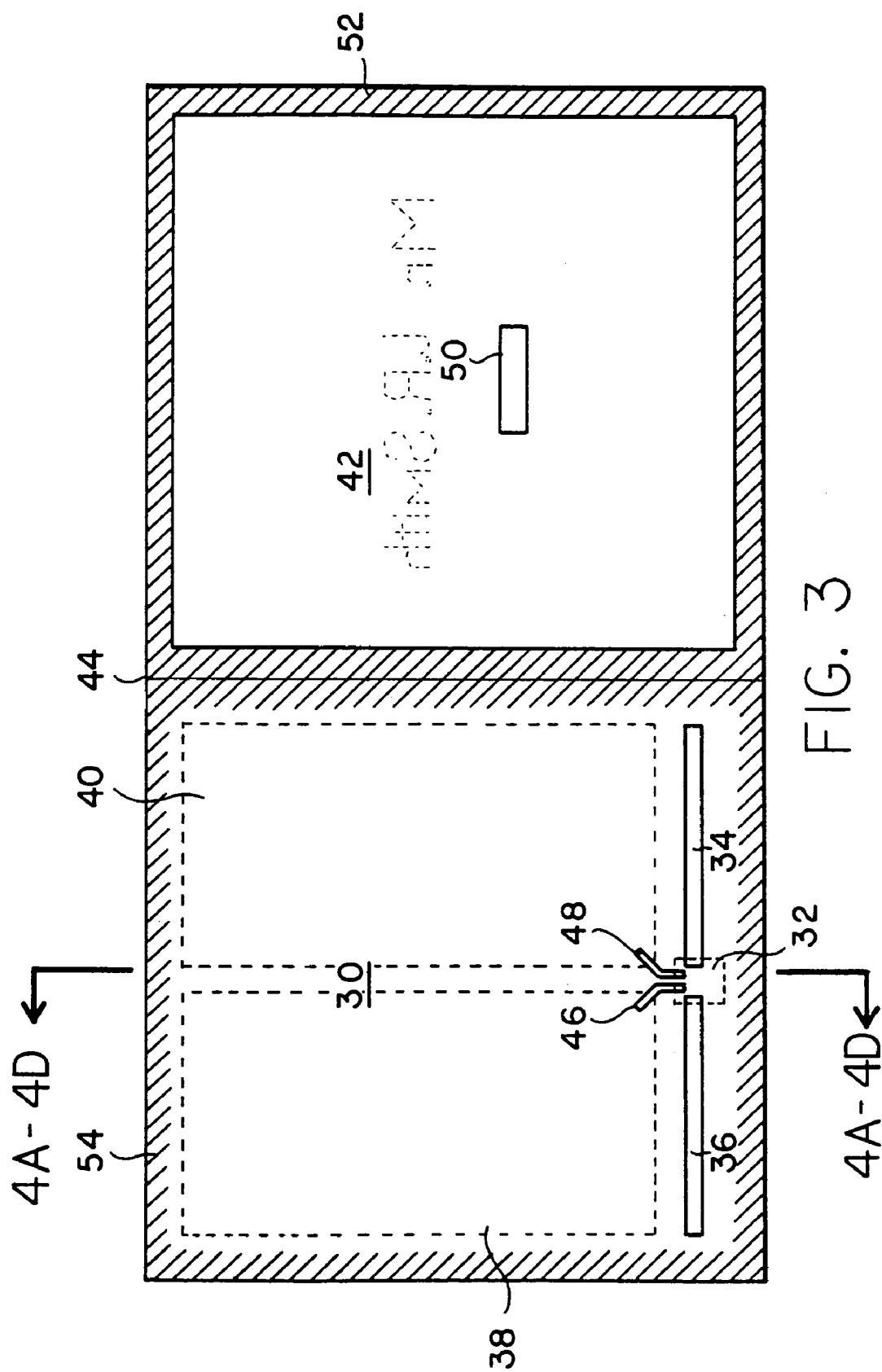
FIG. 3 is a plan view showing the conductive patterns on the base and cover members used in FIG. 2, including dotted line outlines for the locations of the IC chip and batteries which form the FIG. 2 structure.

Referring now to FIG. 3, there is shown a plan view of the geometry of the base support member 30 and the cover member 42 which, during the initial manufacturing stage for the RFID device, are joined at an intersecting line 44. The dipole antenna strips 34 and 36 are shown positioned on each side of the IC chip 32, and the two conductive strips 46 and 48 serve to connect the tops of the batteries 38 and 40 into the IC chip 32. A conductive strip 50 is provided on the upwardly facing inside surface of the top cover 42, so that when the cover 42 is folded by 180 degrees at intersecting line 44, its outer boundary 52 is ready to be sealed with the outer boundary 54 of the base support member 30. Simultaneously, the conductive strip 50 bonded by the conductive epoxy to the batteries 38 and 40, completes the series electrical connection used to connect the two batteries 38 and 40 in series with each other and further in the series circuit with the integrated circuit chip 32 through the two conductors 46 and 48.

Figure 4A:
FIGS. 4A through 4D are cross sectional views taken along lines 4-4 of FIG. 3 showing the four (4) major processing steps which are used in constructing the RFID device and system array in accordance with a preferred process embodiment of the invention.

Referring now to FIGS. 4A through 4D taken at the 4A-4D cross section indicated in FIG. 3, FIG. 4A shows in cross section view the IC chip 32 bonded to the base support member 30 by means of a spot or button of conductive epoxy material 56. The conductive strip 48 is shown in cross section on the upper surface of the base support member 30.

Figure 4B:

Referring now to FIG. 4B, the battery 40 is aligned in place as indicated earlier in FIG. 2 and has the right hand end thereof bonded and connected to the upper surface of the conductive strip 48 by means of a spot of conductive epoxy applied to the upper surface of the conductive strip 48, but not numbered in this figure.

Figure 4C:
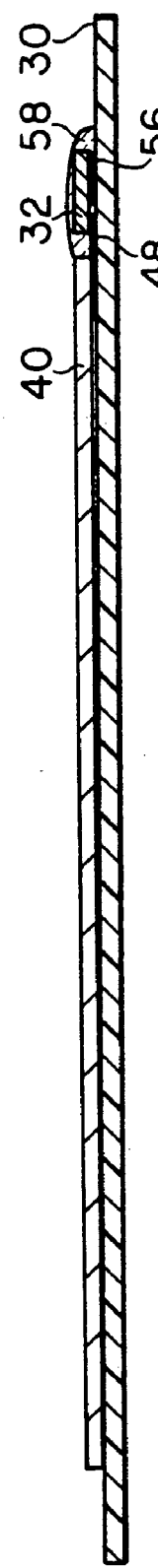

Referring now to FIG. 4C, a stiffener material 58 is applied as shown over the upper and side surfaces of the IC chip 32, and the stiffener material will preferably be an insulating material such as "glob-top" epoxy to provide a desired degree of stiffness to the package and protection for the integrated circuit as completed.

Figure 4D:
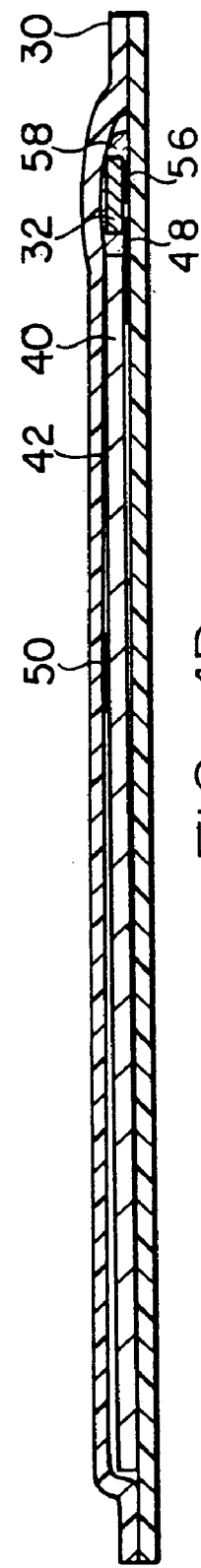

Next, a spot of conductive epoxy is applied to each end of the conductive strip 50, and then the cover layer material 42 with the conductive epoxy thereon is folded over onto the batteries 38 (of FIG. 2) and 40 and the base member 30 to cure and heat seal and thus complete and seal the package in the configuration shown in FIG. 4D. This figure corresponds to the remaining stations 22, 24, and 26 in FIG. 1.

Figure 5:
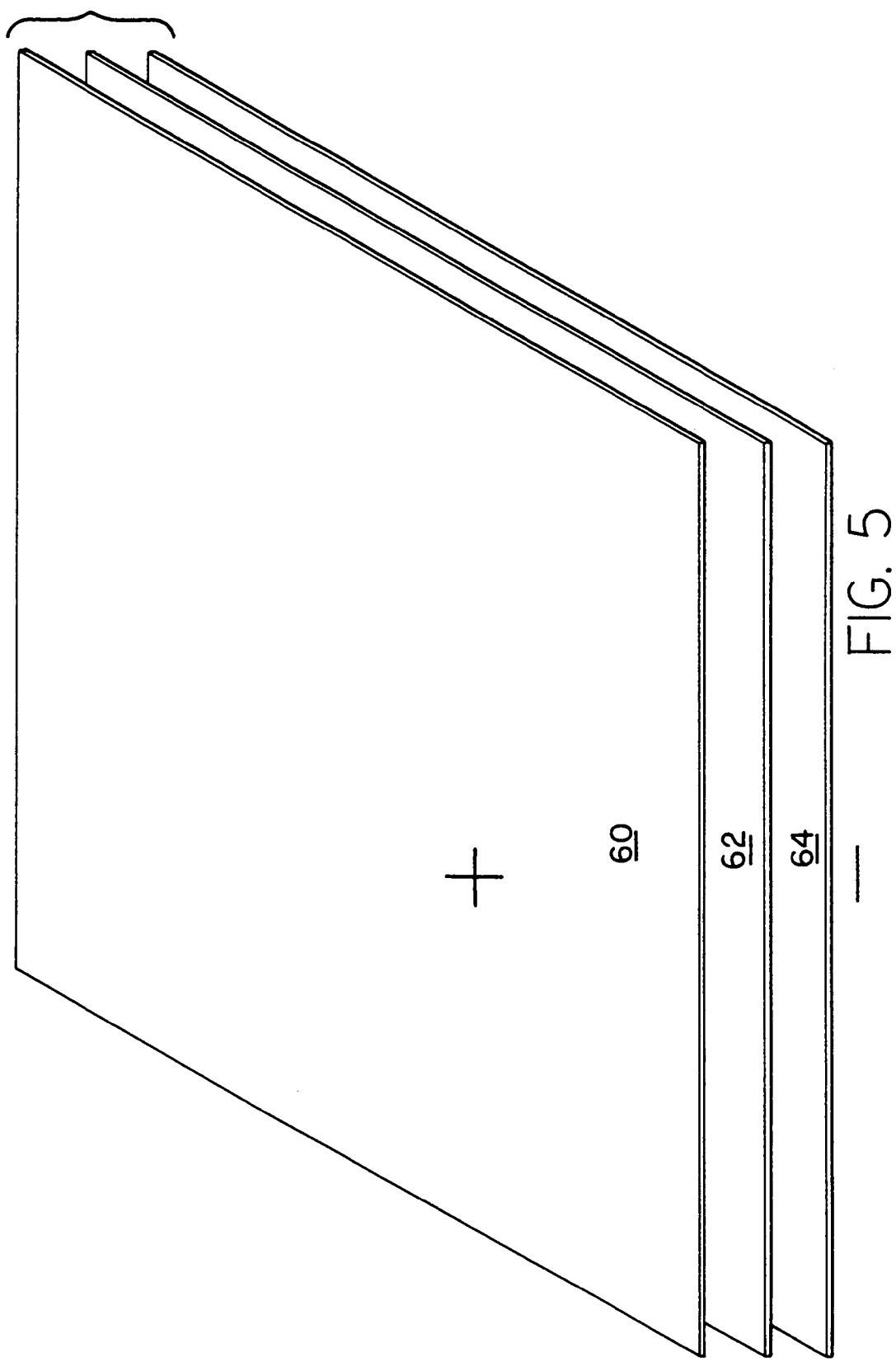
FIG. 5 is a greatly enlarged perspective view of one suitable, very thin lithium/vanadium-oxide/copper battery or cell useful in the label and stamp embodiments and perspective views shown in FIGS. 1 and 2 above.

Referring now to FIG. 5, there is shown in a greatly enlarged perspective view a lithium/vanadium-oxide/copper battery including a lithium anode 60 as a top plate for the battery, an intermediate polymerized vanadium oxide electrolyte and separator layer 62 and a copper collector 64. However, the layer 62 is not limited to the use of vanadium oxide ($V_2O_5$ or $V_6O_{13}$), but may use other oxides such as magnesium oxide, $MnO_2$. The intermediate layer 62 is formed and polymerized on the upper surface of the copper collector 64 and may be obtained from outside manufacturers or vendors as a one piece sheet (62, 64) and then assembled in house with lithium top anode sheets. Alternatively, the thin flat battery structure shown in FIG. 5 may be obtained as a completed battery cell from outside vendors or manufacturers. The thickness of these thin flat batteries will typically be in the range of 1 to 10 mils, and as previously indicated may be made as thin as a fraction of a mil. The components are assembled in an argon or other inert dry atmosphere using state of the art thin dry cell fabrication techniques. The use of conductive polymer layers as separators in thin flat battery cells is generally known in the art and is described, for example, in an article by M. G. Kanatzibis entitled "Conductive Polymers", *Chemical and Engineering News—American Chemical Society*, Dec. 3, 1990, incorporated herein by reference.

Figure 6:
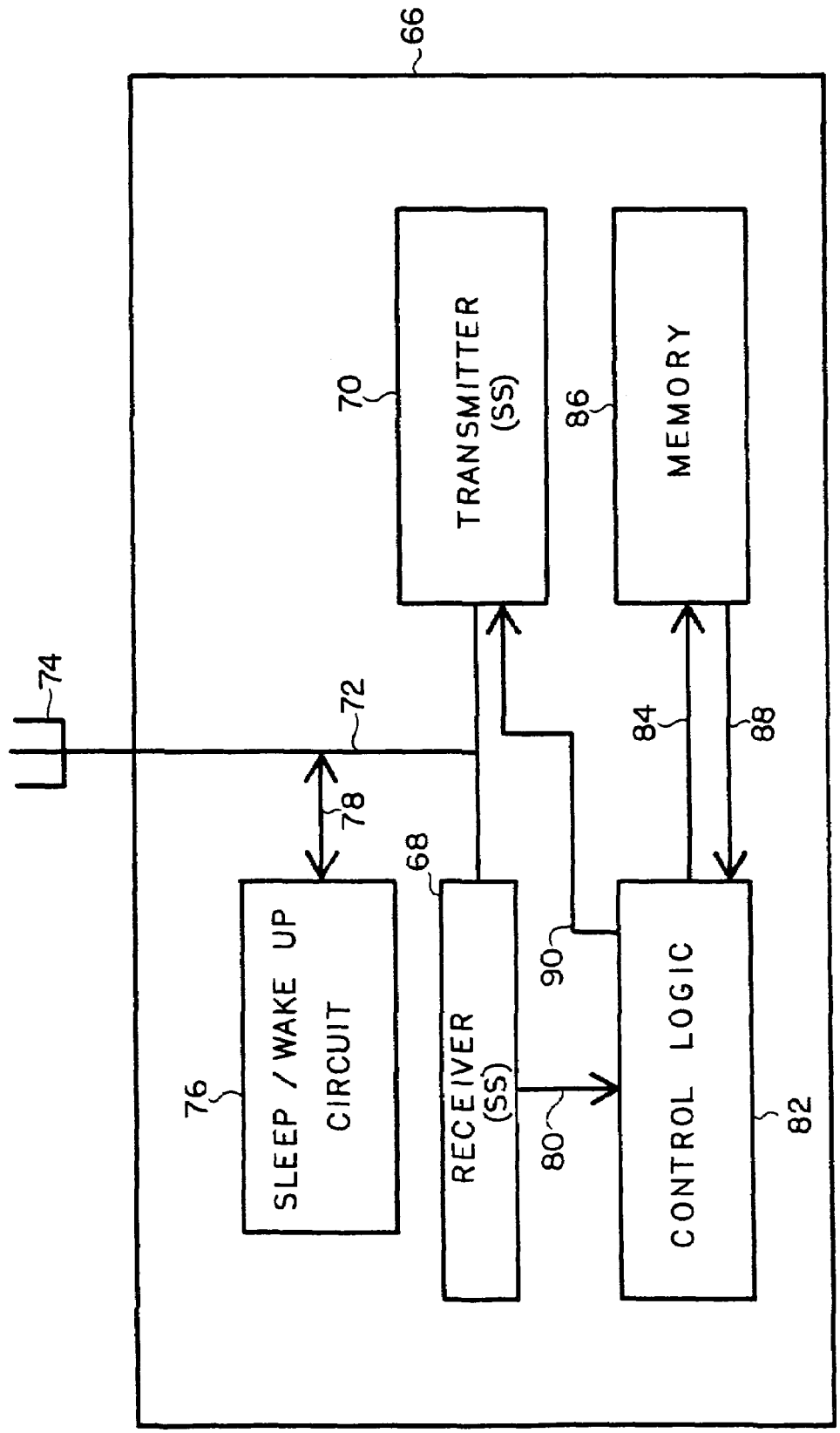
FIG. 6 is a functional block diagram showing the major signal processing stages within the RFID integrated circuit chip described herein and shown in FIGS. 1 and 2 above. These major signal processing stages are also used within the interrogation unit (not shown) which is operative to interrogate the IC chip shown in FIGS. 1 and 2 above.

Referring now to FIG. 6, the rectangular outer boundary 66 in this figure defines the active area on the integrated circuit chip (e.g. 24 in FIG. 1) in which the novel integrated circuit transceiver has been formed using state of the art MOS planar processing techniques. These MOS planar processing techniques are well known in the art and are, therefore, not described in detail herein. Within the chip active area 66 there is provided an RF receiver stage 68 and an RF transmitter stage 70, both connected through a common line or connection 72 to an off-chip antenna 74 of any planar type. A sleep/wake up circuit 76 is also connected via line 78 to the antenna 74 and operates in response to signals received from the antenna 74 to activate the necessary remaining circuitry and stages on the IC chip 66 described below.

The receiver 68 is connected through a line 80 to a control logic stage 82, and a first output line 84 from the control logic stage 82 is connected as an input to the memory stage 86. A return output line 88 from the memory stage 86 connects back to the control logic stage 82, and a second output line 90 from the control logic stage 82 connects as a second input to the transmitter 70 for providing memory or stored input data to the transmitter 70 via the control logic stage 82. In a data encoding operation, the data received concerning ID number, name, route, destination, size, weight, etc. is processed through the receiver 68 and through the control logic stage 82 and encoded into the memory stage 86.

As an example of a data call-up operation, when the RFID package in the above figures is placed on the outside surface of a piece of luggage by the airlines or on a package for shipment by the postal service, either the airline agent or the postal worker will transmit information to the receiver 68 via an RF communication link concerning data such as the owner's name, ID number, point of origin, weight, size, route, destination, and the like. This information received at the receiver stage 68 is then transmitted over line 80 and through the appropriate control logic stage 82 which sorts this information out in a known manner and in turn transmits the data to be stored via lines 84 into a bank of memory 86. This data is stored here in memory 86 until such time that it is desired to call up the data at one or more points along the shipment route.

For example, upon reaching a point of shipment destination, an interrogator may want to call up this data and use it at the point of destination for insuring that the item of shipment or luggage is most ensuredly and efficiently put in the hands of the desired recipient at the earliest possible time. Thus, an interrogator at the destination point will send interrogation signals to the RFID chip 66 where they will be received at the antenna 74 and first processed by a sleep/wake up circuit 76 which operates to bring the FIG. 6 circuitry out of the sleep mode and allow the receiver stage 68 to process this received data to the control logic stage 82 via line 80. At the same time, the requester will be operating an interrogation electronic unit having therein the same circuitry as that shown in FIG. 6, less the sleep/wake up circuit 76.

With all stages in the FIG. 6 circuitry now awake, the memory stage 86 will produce the above six pieces of information relating to the shipped article and generate this data on line 88 and back through the control logic stage 82 into the transmitter 70 so that the transmitter 70 can now transmit this data to the interrogator.

The receiver and transmitter sections 68 and 70 in FIG. 6 will preferably be operated in one of the well known spread spectrum (SS) modes using one of several available SS types of modulation which include: (1) direct sequence, (2) frequency hopping, (3) pulsed FM or chirped modulation, (4) time hopping, or time-frequency hopping used with pulse amplitude modulation, simple pulsed amplitude modulation or binary phase shift keying. The spread spectrum mode of operation per se is generally well known in the art and must conform to the frequency band separation requirements of the FCC Regulations, Part 15, incorporated herein by reference. The circuitry for the interrogation unit (not shown) will be similar to the functional system shown in FIG. 6 as will be understood by those skilled in the art, and therefore the interrogation unit will not be described herein.

Various modifications may be made in and to the above described embodiment without departing from the spirit and scope of this invention. For example, various modifications and changes may be made in the antenna configurations, battery arrangements (such as battery stacking), device materials, device fabrication steps, and the system block diagram in FIG. 6 without departing from the scope of this invention. In addition, the various off chip components such as the antenna, battery, capacitor, and even inductors can be manufactured on-chip within the claims herein. In the case where RF charging is used, a battery will not be required. Accordingly, these and other constructional modifications are within the scope of the following appended claims.

In addition, still other modifications may be made in and to the above described cell fabrication and device fabrication procedures without departing from the spirit and scope of this invention. For example, the present invention is not limited to the use of any particular types of thin flat battery cells or materials or cell fabrication processes, nor is it limited to the particular preferred fabrication technique for the RFID system as shown in FIGS. 2, 3, and 4 above. Moreover, the present invention is not strictly limited to the use of radio frequency communication and may, in environments where RF signals are not allowed, be modified so that the IC chip transceiver is capable of communicating with light waves using certain state of the art electro-optical coupling techniques which are not described herein, but are clearly within the scope of the following appended claims.

Finally, it will be understood and appreciated by those skilled in the art that the present invention also includes forming an optical detector on the IC chip as a means of receiving and detecting signals carried by light and also as a means of powering the RFID transceiver as an alternative to using a battery. Accordingly, these and other systems and constructional modifications are clearly within the scope of the broad claims filed herein.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system, comprising:
   an article to be tracked;
   a flexible radio frequency identification (RFID) label affixed to the article, the RFID label comprising a first thin flexible sheet having a first surface, a dipole antenna disposed on the first sheet, a single integrated circuit (IC) having stored therein an identification code associated with the article, and a second thin flexible sheet affixed to at least a portion of the first surface;
   visual information on the RFID label; and
   an interrogation system including a first interrogator configured to provide power to the IC by RF charging and to communicate with the RFID label using a spread spectrum signal to determine the identification code.

2. The system of claim 1, wherein the first and second sheets are each less than approximately 5 mils thick.

3. The system of claim 2, wherein the IC is disposed between the first and second sheets.

4. The system of claim 2, wherein the visual information includes text printed on the second sheet.

5. The system of claim 1, wherein the interrogation system is configured to determine description information associated with the article.

6. The system of claim 5, wherein the interrogation system is configured to determine source information associated with the article.

7. The system of claim 6, wherein the description information and the source information are stored in the IC.

8. The system of claim 1, wherein the first interrogator and the RFID label are configured to communicate using at least one of an amplitude or phase shift keying modulation technique.

9. The system of claim 8, wherein the spread spectrum signal performs frequency hopping.

10. The system of claim 1, wherein the first interrogator is located at a shipment origin, and wherein the interrogation system further includes a second interrogator located at a shipment destination.

11. The system of claim 1, further comprising:
    a second article to be tracked; and
    a second flexible REID label affixed to the second article;
    wherein the interrogation system is configured to use a laser diode to determine, from the second REID label, an identification code associated with the second article.

12. An article tracking system, comprising:
    a plurality of articles;
    a plurality of REID labels, each of the REID labels affixed to a respective one of the articles and comprising a respective first thin sheet having a respective first surface, a respective antenna disposed on the respective first sheet, a respective single integrated circuit (IC) comprising a respective transceiver, and a respective second thin sheet affixed to at least a portion of the respective first surface;
    respective visual information on each of the plurality of REID labels; and
    an interrogation system configured to use RF signals to determine, from at least one of the RFID labels, an identification code associated with at least one of the articles, and configured to use a light signal to determine, from at least one of the REID labels, data associated with at least one of the articles.

13. The article tracking system of claim 12, wherein the IC is disposed between the first and second sheets.

14. The article tracking system of claim 12, wherein the visual information includes text.

15. The article tracking system of claim 12, wherein the interrogation system includes a first interrogator located at a shipment origin and a second interrogator located at a shipment destination, wherein the first and second interrogators are configured to communicate using a spread spectrum technique in conjunction with at least one of an amplitude shift or phase shift modulation technique.

16. The article tracking system of claim 15, wherein the first sheet is less than approximately 5 mils thick.

17. The article tracking system of claim 12, wherein the first and second sheets are each less than approximately 5 mils thick.

18. The article tracking system of claim 17, wherein the interrogation system is configured to determine description information associated with the article.

19. The article tracking system of claim 18, wherein the description information is stored in the IC.

20. The article tracking system of claim 12, wherein a source of the light signal includes a laser diode.

21. The article tracking system of claim 20, wherein the interrogation system includes a first interrogator located at a shipment origin and a second interrogator located at a shipment destination.

22. The article tracking system of claim 21, wherein the first sheet is less than approximately 5 mils thick, and wherein the first and second interrogators are configured to communicate using a spread spectrum technique.

23. A system, comprising:
a first article;
a first RFID label affixed to the first article and comprising a first thin sheet having a first surface, an antenna, a single integrated circuit (IC), and a second thin sheet affixed to at least a portion of the first surface; and
an interrogation system comprising a first interrogator and a second interrogator, wherein the interrogation system is configured to communicate with the first RFID label using a spread spectrum signal modulated using at least one of amplitude or phase shift keying to determine an identification code associated with the first article.

24. The system of claim 23, further comprising:
a second article; and
a second REID label affixed to the second article and comprising a first sheet less than approximately 5 mils thick having a first surface, an antenna, a single integrated circuit, and a second sheet affixed to at least a portion of the first surface;
wherein the interrogation system is further configured to use a light signal to determine, from the second RFID label, an identification code associated with the second article.

25. The system of claim 24, wherein a source of the light signal includes a laser diode.

26. The system of claim 23, wherein the antenna of the first label is disposed on the first surface of the first label.

27. The system of claim 23, wherein the interrogation system is configured to associate the identification code with the first article.

28. The system of claim 27, wherein the interrogation system is configured to associate the identification code with the first article by encoding the identification code in the first label.

29. The system of claim 27, wherein the first interrogator is located at an origin of shipment of the first article and the second interrogator is located at a destination of shipment of the first article.

30. The system of claim 29, wherein the interrogation system further comprises a third interrogator located at a point along a shipment route of the first article.

31. The system of claim 27, wherein the interrogation system is configured to determine description information associated with the first article.

32. The system of claim 31, wherein the description information is stored in the first label.

33. The system of claim 31, further comprising information printed on the second sheet of the first label.

34. The system of claim 23, further comprising characters printed on the second sheet of the first label.

35. The system of claim 34, wherein the first and second sheets are each less than approximately 5 mils thick.

36. The system of claim 23, wherein the interrogation system is configured to provide power to the first label by RF charging.

37. The system of claim 23, wherein the first label further comprising a battery and wake up circuitry configured to awaken the IC from a sleep mode upon detecting a predetermined signal via the antenna, the battery and the IC being disposed between the first and second sheets.

38. The system of claim 23, wherein the battery is less than approximately 30 mils thick.

39. A method of tracking articles, comprising:
providing an REID label comprising a first thin flexible sheet having a first surface, an antenna disposed on the first sheet, a single integrated circuit (IC) coupled to the antenna, and a second thin flexible sheet affixed to at least a portion of the first surface;
affixing the label to an article;
reading the label electronically at a shipment origin to determine at least a portion of identifying information associated with the article, the at least portion of the identifying information including an identification code; and
shipping the article to a shipment destination.

40. The method of claim 39, further comprising storing the identification code in the IC, and printing characters on the label.

41. The method of claim 40, wherein reading the label includes interrogating the label using a spread spectrum RF signal.

42. The method of claim 41, wherein the first sheet is less than approximately5 mils thick and the second sheet is less than approximately 5 mils thick.

43. The method of claim 39, wherein reading the label includes interrogating the label using a frequency hopping spread spectrum RF signal.

44. The method of claim 43, wherein the identification code is stored in the IC.

45. The method of claim 39, wherein reading the label includes using light to determine the at least portion of the identifying information from the label.

46. The method of claim 45, wherein a source of the light includes a laser diode.

47. The method of claim 39, further comprising:
receiving the article at the shipment destination; and
reading the label electronically at the shipment destination to determine the at least portion of the identifying information associated with the article.

48. The method of claim 47, further comprising reading the label electronically at a point along a shipment route, between the shipment origin and the shipment destination, to determine the at least portion of the identifying information associated with the article.

49. The method of claim 47, further comprising determining the shipment origin of the article from the at least portion of the identifying information read at the shipment destination.

50. The method of claim 49, wherein the shipment origin is stored in the label.

51. The method of claim 39, wherein the first sheet is less than approximately 5 mils thick, the second sheet is less than approximately 5 mils thick, and the identification code is stored in the IC.

52. The method of claim 51, wherein reading the label comprises providing power to the label by RF charging.

53. The method of claim 39, wherein the label comprises a battery, and reading the label comprises transmitting an RF signal and waking up the IC from a sleep mode in response to detecting the signal.

54. A method of tracking articles, comprising:
receiving a plurality of articles at a shipment destination, each of the articles having affixed thereto a respective RHO label comprising a respective first thin sheet having a first surface, a respective antenna disposed on the first sheet, a single respective integrated circuit (IC) coupled to the antenna, and a respective second thin sheet affixed to at least a portion of the first surface;
transmitting to the articles a spread spectrum RF signal;
receiving, in response to the signal, data stored in a first IC of a first label affixed to a first article of the plurality of articles; and
treating the first article based at least in part on the data received from the first label.

55. The method of claim 54, further comprising providing power to the first label by RF charging.

56. The method of claim 55, further comprising:
using an electronic unit that uses light waves to determine information from a second label affixed to a second article of the plurality of articles; and
treating the second article based at least in part on the information received from the second label.

57. The method of claim 56, wherein the first sheet is less than approximately 5 mils thick.

58. The method of claim 57, wherein characters are printed on the second sheet.

59. The method of claim 54, wherein the IC is disposed between the first and second sheets.

60. The method of claim 54, further comprising using a laser diode to determine information from a second label affixed to a second article of the plurality of articles.

61. The method of claim 54, wherein the first sheet is less than approximately 5 mils thick and the second sheet is less than approximately 5 mils thick.

62. The method of claim 61, further comprising interrogating the first label at a shipment origin to determine the data.

63. The method of claim 54, further comprising determining a source of the first article from the data, the data including an identification code.

64. The method of claim 54, further comprising waking up the first IC from a sleep mode in response to the RF signal, wherein the first IC is coupled to a battery.

65. A radio frequency identification (REID) label, comprising:
a first, thin, flexible sheet having a substantially uniform thickness, the first sheet comprising a first surface;
an antenna substantially disposed on the first sheet;
a single integrated circuit (IC), wherein the IC is coupled to the antenna and comprises memory configured to store data and a transceiver configured to receive a signal and to provide the data in response to the signal;
a second, thin, flexible sheet having a substantially uniform thickness, the second sheet comprising a second surface, wherein at least a portion of the second surface is affixed to at least a portion of the first surface; and
adhesive material to affix the label to an article.

66. The REID label of claim 65, wherein the antenna is substantially disposed on the first surface of the first sheet.

67. The RFID label of claim 65, wherein the IC is disposed between the first and second surfaces.

68. The REID label of claim 67, wherein the at least portion of the first surface substantially surrounds the IC and the antenna.

69. The REID label of claim 68, wherein at least a portion of the antenna is in contact with at least a portion of the second surface.

70. The REID label of claim 69, wherein the first sheet is less than approximately 5 mils thick, and the antenna is less than approximately 2 mils thick.

71. The REID label of claim 65, wherein the first sheet is less than approximately 5 mils thick, the second sheet is less than approximately 5 mils thick, and the antenna is less than approximately 2 mils thick.

72. The REID label of claim 65, wherein the at least portion of the first surface includes an outer boundary of the first surface.

73. The REID label of claim 72, wherein the IC and the antenna are disposed between the first and second surfaces.

74. The RFID label of claim 73, wherein the first and second sheets form a hermetically sealed enclosure.

75. The REID label of claim 65, wherein the antenna is a dipole antenna.

76. The REID label of claim 75, wherein the antenna primarily comprises a printed conductive material.

77. The REID label of claim 65, wherein the transceiver comprises circuitry disposed on a surface of the IC facing the first sheet.

78. The REID label of claim 65, further comprising a stiffener material disposed adjacent to a surface of the IC.

79. The REID label of claim 65, further comprising a flexible battery coupled to the IC.

80. The RFID label of claim 79, wherein the IC further comprises a wake up circuit configured to awaken the IC from a sleep mode upon detecting a wake up signal via the antenna.

81. The REID label of claim 65, wherein the at least portion of the second surface is affixed to the at least portion of the first surface by a heat seal.

82. The REID label of claim 65, wherein the second sheet is configured to receive printed information.

83. The REID label of claim 65, wherein the first sheet and the second sheet each comprise a portion of a single film that is folded over onto itself.

84. The REID label of claim 65, wherein the IC is configured to be electrically powered using RF charging from a remote RF source.

85. A radio frequency identification (RFID) device, comprising:
a first, flexible sheet having a substantially uniform thickness of less than approximately 5 mils, the first sheet comprising a first surface;
a dipole antenna disposed on the first sheet, wherein the antenna has a substantially uniform thickness of less than approximately 2 mils; and
a single integrated circuit (IC), wherein the IC is coupled to the antenna and comprises memory configured to store data, a receiver configured to receive a signal, and a transmitter configured to provide the data in response to the signal;

wherein at least a perimeter region of the first surface is configured to be affixed to a second surface of a second, thin, flexible sheet.

86. The REID device of claim 85, further comprising the second sheet, wherein the second sheet has a substantially uniform thickness of less than approximately 5 mils, and the at least perimeter region of the first surface is affixed to the second surface.

87. The REID device of claim 86, wherein a substantial portion of the antenna is in contact with the second surface.

88. The RFID device of claim 87, wherein the at least perimeter region of the first surface is affixed to the second surface by a heat seal.

89. The REID device of claim 88, wherein the first and second sheets form a hermetically sealed enclosure.

90. The REID device of claim 85, wherein the antenna primarily comprises a printed conductive material.

91. The REID device of claim 90, wherein an active area of the IC faces the first sheet.

92. The REID device of claim 85, further comprising a stiffener material disposed adjacent to a surface of the IC.

93. The REID device of claim 85, further comprising a flexible battery coupled to the IC, wherein the battery is less than approximately 30 mils thick.

94. The RFID device of claim 85, further comprising a flexible battery coupled to the IC, wherein the IC further comprises a wake up circuit configured to awaken the device from a sleep mode upon detecting a predetermined signal via the antenna.

95. The REID device of claim 85, wherein the antenna is disposed on the first surface of the first sheet.

96. The REID device of claim 95, wherein the IC is disposed on the first surface of the first sheet.

97. The REID device of claim 85, wherein the first sheet and the second sheet each comprise a portion of a film that is folded over onto itself.

98. The REID device of claim 85, wherein the IC is configured to be electrically powered by RF charging from a remote RF source.

* * * * *

UNITED STATES PATENT AND TRADEMARK OFFICE
CERTIFICATE OF CORRECTION

| | | |
|---|---|---|
| PATENT NO. | : 7,265,674 B2 | |
| APPLICATION NO. | : 11/206350 | |
| DATED | : September 4, 2007 | |
| INVENTOR(S) | : Tuttle | |

It is certified that error appears in the above-identified patent and that said Letters Patent is hereby corrected as shown below:

On the face page, in field (54), in "Title", in column 1, line 1, after "THIN" insert -- , --.

On the face page, in field (57), under "Abstract", in column 2, line 1, delete "REID" and insert -- RFID --, therefor.

In column 1, line 1, after "THIN" insert -- , --.

In column 8, line 42 (Approx.), in Claim 11, delete "REID" and insert -- RFID --, therefor.

In column 8, line 45 (Approx,), in Claim 11, delete "REID" and insert -- RFID --, therefor.

In column 8, line 50, in Claim 12, after "of" delete "REID" and insert -- RFID --, therefor.

In column 8, line 50, in Claim 12, after "the" delete "REID" and insert -- RFID --, therefor.

In column 8, line 59, in Claim 12, delete "REID" and insert -- RFID --, therefor.

In column 8, line 64, in Claim 12, delete "REID" and insert -- RFID --, therefor.

In column 9, line 44, in Claim 24, delete "REID" and insert -- RFID --, therefor.

In column 10, line 26 (Approx.), in Claim 39, delete "REID" and insert -- RFID --, therefor.

In column 10, line 46 (Approx.), in Claim 42, delete "approximately5" and insert -- approximately 5 --, therefor.

In column 11, line 20, in Claim 54, delete "RHO" and insert -- RFID --, therefor.

In column 11, line 61, in Claim 65, delete "REID" and insert -- RFID --, therefor.

In column 12, line 8, in Claim 66, delete "REID" and insert -- RFID --, therefor.

In column 12, line 12, in Claim 68, delete "REID" and insert -- RFID --, therefor.

In column 12, line 15, in Claim 69, delete "REID" and insert -- RFID --, therefor.

UNITED STATES PATENT AND TRADEMARK OFFICE
CERTIFICATE OF CORRECTION

PATENT NO.         : 7,265,674 B2
APPLICATION NO. : 11/206350
DATED              : September 4, 2007
INVENTOR(S)       : Tuttle It is certified that error appears in the above-identified patent and that said Letters Patent is hereby corrected as shown below:

In column 12, line 18, in Claim 70, delete "REID" and insert -- RFID --, therefor.

In column 12, line 21, in Claim 71, delete "REID" and insert -- RFID --, therefor.

In column 12, line 25, in Claim 72, delete "REID" and insert -- RFID --, therefor.

In column 12, line 28, in Claim 73, delete "REID" and Insert -- RFID --, therefor.

In column 12, line 32, in Claim 75, delete "REID" and insert -- RFID --, therefor.

In column 12, line 34, in Claim 76, delete "REID" and insert -- RFID --, therefor.

In column 12, line 36, in Claim 77, delete "REID" and insert -- RFID --, therefor.

In column 12, line 39, In Claim 78, delete "REID" and insert -- RFID --, therefor.

In column 12, line 41, In Claim 79, delete "REID" and insert -- RFID --, therefor.

In column 12, line 47, in Claim 81, delete "REID" and insert -- RFID --, therefor.

In column 12, line 50, in Claim 82, delete "REID" and insert -- RFID --, therefor.

In column 12, line 52, in Claim 83, delete "REID" and insert -- RFID --, therefor.

In column 12, line 55, in Claim 84, delete "REID" and insert -- RFID --, therefor.

In column 13, line 7, in Claim 86, delete "REID" and insert -- RFID --, therefor.

In column 13, line 9, in Claim 86, delete "approximately5" and insert -- approximately 5 --, therefor.

In column 13, line 12, in Claim 87, delete "REID" and insert -- RFID --, therefor.

In column 13, line 17, in Claim 89, delete "REID" and insert -- RFID --, therefor.

In column 13, line 19, in Claim 90, delete "REID" and insert -- RFID --, therefor.

In column 13, line 21, in Claim 91, delete "REID" and insert -- RFID --, therefor.

In column 14, line 1, in Claim 92, delete "REID" and insert -- RFID --, therefor.

UNITED STATES PATENT AND TRADEMARK OFFICE
CERTIFICATE OF CORRECTION

PATENT NO.       : 7,265,674 B2
APPLICATION NO.  : 11/206350
DATED            : September 4, 2007
INVENTOR(S)      : Tuttle It is certified that error appears in the above-identified patent and that said Letters Patent is hereby corrected as shown below:

In column 14, line 3, in Claim 93, delete "REID" and insert -- RFID --, therefor.

In column 14, line 11, in Claim 95, delete "REID" and insert -- RFID --, therefor.

In column 14, line 13, in Claim 96, delete "REID" and insert -- RFID --, therefor.

In column 14, line 15, in Claim 97, delete "REID" and insert -- RFID --, therefor.

In column 14, line 18, in Claim 98, delete "REID" and insert -- RFID --, therefor.

Signed and Sealed this

Thirteenth Day of November, 2007

JON W. DUDAS
*Director of the United States Patent and Trademark Office*

US007265674C1

(12) EX PARTE REEXAMINATION CERTIFICATE (9002nd)

United States Patent
Tuttle

(10) Number: US 7,265,674 C1
(45) Certificate Issued: May 8, 2012

(54) THIN, FLEXIBLE, RFID LABELS, AND METHOD AND APPARATUS FOR USE

(75) Inventor: John R. Tuttle, Corrales, NM (US)

(73) Assignee: Round Rock Research, LLC, Mt. Kisco, NY (US)

Reexamination Request:
No. 90/011,924, Sep. 25, 2011

Reexamination Certificate for:
Patent No.: 7,265,674
Issued: Sep. 4, 2007
Appl. No.: 11/206,350
Filed: Aug. 18, 2005

Certificate of Correction issued Nov. 13, 2007.

Related U.S. Application Data

(63) Continuation of application No. 10/705,685, filed on Nov. 10, 2003, now Pat. No. 7,158,031, which is a continuation of application No. 09/481,807, filed on Jan. 11, 2000, now Pat. No. 6,741,178, which is a division of application No. 08/934,701, filed on Sep. 22, 1997, now Pat. No. 6,013,949, which is a continuation of application No. 08/610,236, filed on Mar. 4, 1996, now abandoned, which is a continuation of application No. 08/168,909, filed on Dec. 17, 1993, now Pat. No. 5,497,140, which is a continuation of application No. 07/928,899, filed on Aug. 12, 1992, now abandoned.

(51) Int. Cl.
*G08B 13/14* (2006.01)

(52) U.S. Cl. .................. 340/572.1; 340/10.1; 340/572.7; 340/572.8; 235/380; 235/492

(58) Field of Classification Search .................. None
See application file for complete search history.

(56) References Cited

To view the complete listing of prior art documents cited during the proceeding for Reexamination Control Number 90/011,924, please refer to the USPTO's public Patent Application Information Retrieval (PAIR) system under the Display References tab.

*Primary Examiner* — Adam Basehoar

(57) ABSTRACT

A radio frequency identification (RFID) device may include a first, thin, flexible sheet, an antenna, and an integrated circuit. A surface portion of the first sheet may be affixed to a second, thin, flexible sheet to form a thin, flexible label. Such a label may be affixed to an article for tracking by an interrogation system.

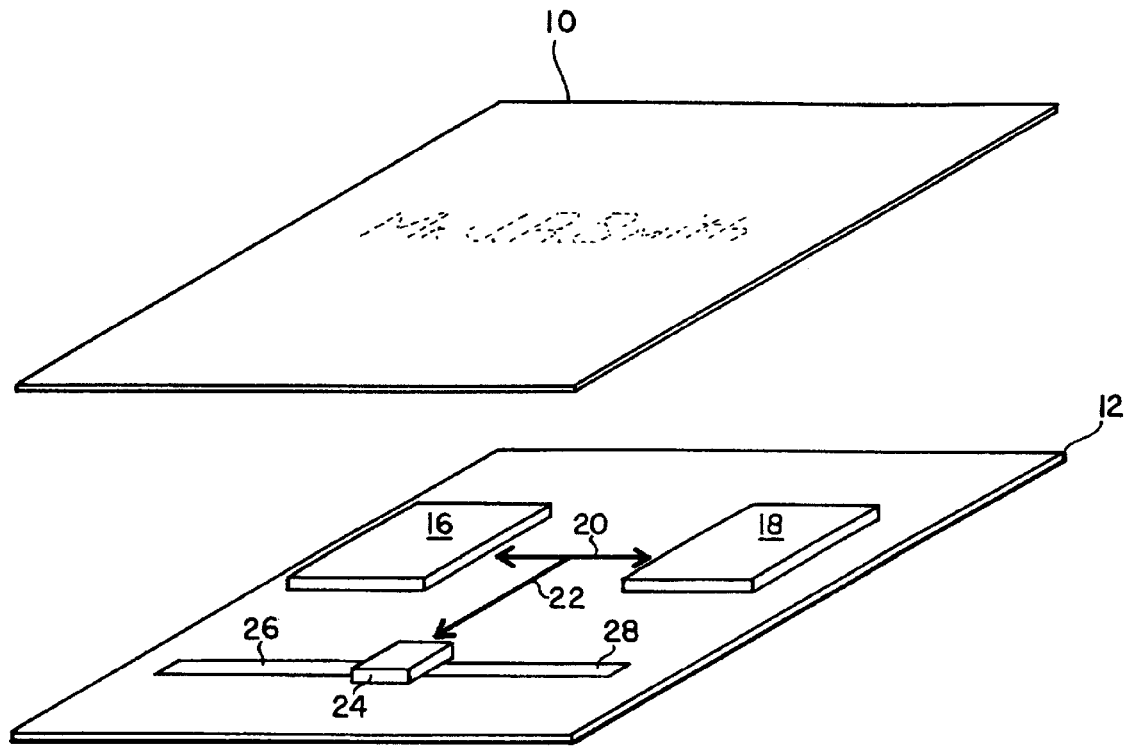

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-98 is confirmed.

* * * * *

(12) EX PARTE REEXAMINATION CERTIFICATE (10498th)
United States Patent
Tuttle

(10) Number: US 7,265,674 C2
(45) Certificate Issued: Feb. 9, 2015

(54) THIN, FLEXIBLE, RFID LABELS, AND METHOD AND APPARATUS FOR USE

(75) Inventor: John R. Tuttle, Corrales, NM (US)

(73) Assignee: Round Rock Research, LLC, Mt. Kisco, NY (US)

Reexamination Request:
No. 90/012,236, Apr. 4, 2012

Reexamination Certificate for:
Patent No.: 7,265,674
Issued: Sep. 4, 2007
Appl. No.: 11/206,350
Filed: Aug. 18, 2005

Reexamination Certificate C1 7,265,674 issued May 8, 2012

Certificate of Correction issued Nov. 13, 2007

Related U.S. Application Data

(60) Continuation of application No. 10/705,685, filed on Nov. 10, 2003, now Pat. No. 7,158,031, which is a continuation of application No. 09/481,807, filed on Jan. 11, 2000, now Pat. No. 6,741,178, which is a division of application No. 08/934,701, filed on Sep. 22, 1997, now Pat. No. 6,013,949, which is a continuation of application No. 08/610,236, filed on Mar. 4, 1996, now abandoned, which is a continuation of application No. 08/168,909, filed on Dec. 17, 1993, now Pat. No. 5,497,140, which is a continuation of application No. 07/928,899, filed on Aug. 12, 1992, now abandoned.

(51) Int. Cl.
*G08B 13/14* (2006.01)
*G06K 19/07* (2006.01)
*G06K 19/073* (2006.01)
*G06K 19/077* (2006.01)

(52) U.S. Cl.
USPC ............ 340/572.1; 340/572.7; 340/572.8; 340/10.1; 235/380; 235/492

(58) Field of Classification Search
None
See application file for complete search history.

(56) References Cited

To view the complete listing of prior art documents cited during the proceeding for Reexamination Control Number 90/012,236, please refer to the USPTO's public Patent Application Information Retrieval (PAIR) system under the Display References tab.

*Primary Examiner* — Michael J. Yigdall

(57) ABSTRACT

A radio frequency identification (RFID) device may include a first, thin, flexible sheet, an antenna, and an integrated circuit. A surface portion of the first sheet may be affixed to a second, thin, flexible sheet to form a thin, flexible label. Such a label may be affixed to an article for tracking by an interrogation system.

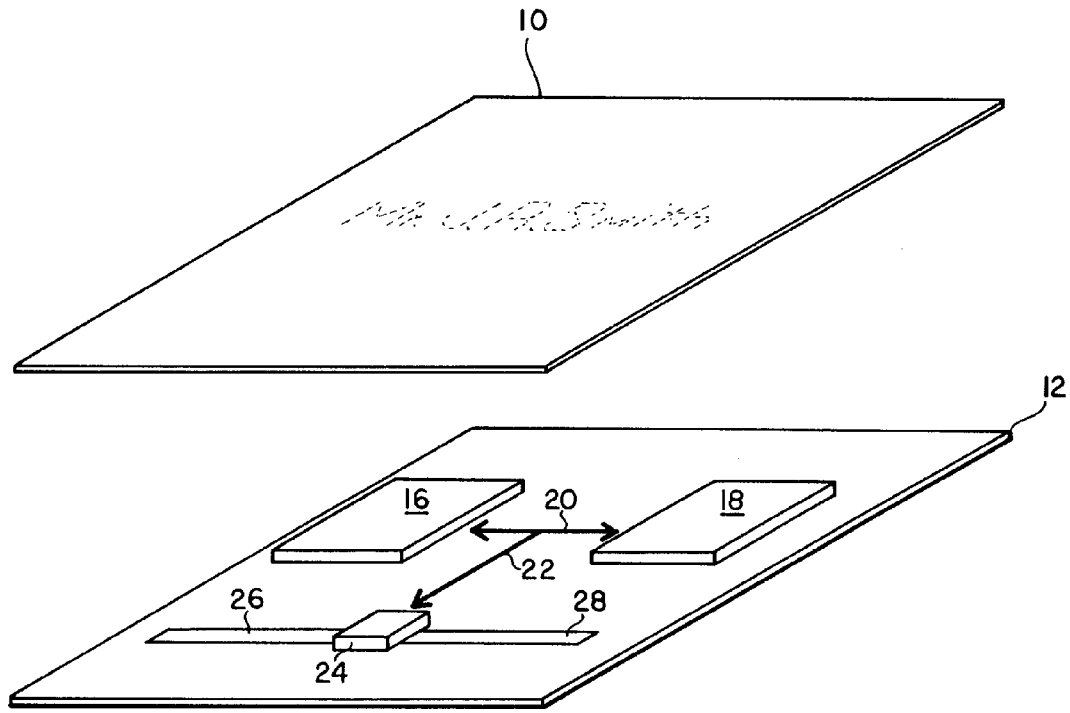

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 78 and 92 is confirmed.

Claims 1-77, 79-91 and 93-98 are cancelled.

* * * * *